Sept. 10, 1968  G. WONDRAK  3,401,096
METHOD FOR SEPARATION OF MATERIAL BY PARTIAL CONDENSATION
Filed July 28, 1964
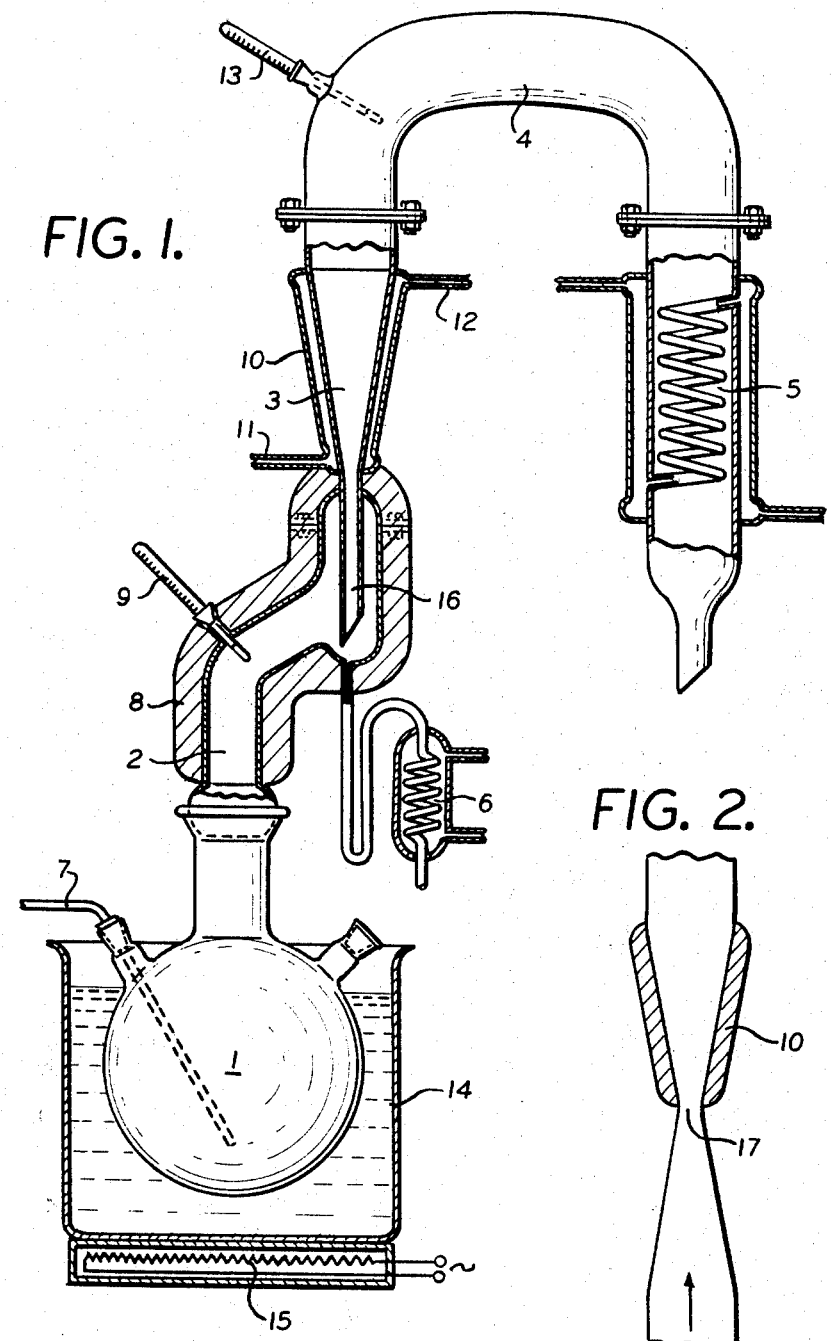
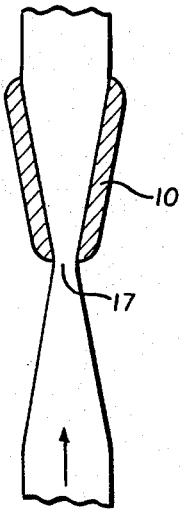
INVENTOR
GUSTAV WONDRAK
BY
ATTORNEY.

3,401,096
METHOD FOR SEPARATION OF MATERIAL BY PARTIAL CONDENSATION
Gustav Wondrak, Vienna, Austria, assignor of one-half to Friedrich Kohler, Vienna, Austria
Filed July 28, 1964, Ser. No. 385,717
3 Claims. (Cl. 203—87)

ABSTRACT OF THE DISCLOSURE

A method of separation of material by partial condensation of a vapor mixture which comprises the step of passing a vapor mixture into a zone of gradually increasing cross-sectional dimensions in the direction of flow, simultaneously controlling the temperature in the zone to a preselected temperature to condense from the vapor mixture a portion thereof and to leave an uncondensed portion. The uncondensed portion of the vapor mixture is removed from the end of the zone having the largest cross-sectional area.

---

The present invention relates to a method of and apparatus for separation of material by partial condensation, in general, and to such a method for separation of material by partial vapor condensation of a vapor mixture (dephlegmation), in particular, which I call "fractional condensation."

The possibility, to resolve a mixture of material by evaporation into its components is based on the difference of the vapor pressures of the individual components. In principle, two methods are known. On the one hand, a mixture of liquids can be evaporated partly, whereby the created vapor is completely condensed (distillation). In most instances one part of the condensate is removed as product and the other part is returned in a counter-current process. In fractional distillation, this process is repeated, whereby the reflux is either evaporated in steps (plate columns) or continuously (packed columns), so that the enrichment of easier boiling components rises within the vapor stream. The second method uses a partial condensation of a vapor mixture (dephlegmation). Contrary to distillation the reflux containing the heavier boiling components is formed in the separating system itself and not later at the upper end of the column. The dephlegmation or "fractional condensation" can be performed alone or in combination with a distillation. In both methods, the best (theoretical) separation effect can be obtained, if in any instant the condensate (reflux) and the streaming vapor are in thermodynamic equilibrium.

While, during distillation, first of all, due to the easy application of the multiplication principle, in principle a better separation effect can be obtained, the dephlegmation or "fractional condensation" should always show advantages there, where long heating and repeated evaporation of the mixture of the material is to be avoided, such as, the quick and energy-saving separations of material of components of sufficiently different volatility, the separation of thermally sensitive substances, etc. In recent years, however, the development of the dephlegmation process has fallen far behind the development of the distillation process. The reason for this resides in the fact, that it was generally not possible to achieve equilibrium between vapor and condensate, to enforce in each cross-sectional plane perpendicularly to the vapor stream.

Due to the lack of equilibrium, the separation effect is reduced; in particular, as measurements have demonstrated (see Kirschbaum and Lipphardt, Chemie and Ingenieurtechnik 29, pages 393 to 397 (1957); Tröster, Chemie and Ingenieurtechnik 32, pages 525 to 531 (1960); Herrmann E. Decomposition of mixtures of two materials by partial condensation of their vapors; Dissertation T. H. Karlsruhe 1954), the stronger the streaming velocity of the vapor, the more the separation is decreased. That means, that the method of dephlegmation did not work under those circumstances, where it would be of greatest interest.

It is, therefore, one object of the present invention to provide a method of and apparatus for the separation of material by partial condensation of vapor mixtures, wherein the dephlegmation process is improved in such a way, that the drawbacks of the known dephlegmation methods are avoided.

Earlier it was proposed to apply ball coolers, since it was assumed that due to an importance of the stream conditions in the vapor by an increase of the turbulence in the vapor, an improvement could be expected (see Kirschbaum "The Amplification by partial condensation of binary mixtures and its consideration in the calculation of rectification apparatus" 2. Dechema Monography Berlin, Verl. Chemie 1930).

It is another object of the present invention to provide a method of and an apparatus for the separation of material by partial condensation, wherein use is made of a continuous increase of the cross-section of the vapor stream, in order to bring the vapor into more intimate contact with the cooled condensate.

With this measure, a decisive improvement in achieving near-equilibrium between vapor and condensate is obtained. This makes itself felt particularly in that the separation effect is nearly independent of the flow rate, so that the separation of the materials can be performed successfully even at very high streaming velocities. This is achieved so much more, since under my streaming conditions entrained droplets of the higher boiling component are also condensed and removed.

Furthermore, the separation effect is in the present method independent of whether the direction of flow of condensate or cooling medium is parallel or counter-current to the streaming direction of the vapor, which is contrary to the known process. Because of this arrangement the dephlegmator can be operated in any position, which is advantageous in connection with high vapor speeds.

The adjustment of the temperature appropriate to partial condensation is effected either by cooling the zone of the continuous increase of the cross-section of the vapor stream, or by a proper temperature control of the vapor stream prior to entering the zone.

It is another object of the present invention to provide an apparatus for separation of material by partial condensation, wherein the dephlegmator comprises a tube conically widening in the direction of the stream to which tube an evaporation device is preset. The tube can, thereby, be placed in any desired position.

In accordance with the present invention, the conically widening tube is surrounded by a cooling jacket, consequently, the vapor stream entering the tube is directed to cooled walls.

It is still another object of the present invention to provide an apparatus for separation of material by partial condensation, wherein the vapor conduit feeding into the conically widening tube is surrounded by a temperature controlling device for the tempering of the vapor.

A conically narrowing tube is suitably provided between the entering point of the conically widening tube and the evaporation device, such that the two tubes are connected together at the point of the smallest cross-section.

Advantageously, a plurality of dephlegmators are disposed in series and/or parallel adjacent each other.

With these and other objects in view, which will become apparent in the following detailed description, the present invention may be clearly understood in connection with the accompanying drawing, in which:

FIGURE 1 is a schematic elevation, partly in section, of an apparatus for separation of material by partial condensation; and FIG. 2 is a fragmentary axial section of another embodiment thereof.

Referring now to the drawing, and in particular to FIG. 1, the apparatus comprises a pot or still 1, a feeding branch 2, a dephlegmator 3, a bend 4, a distillate cooler 5 and a condensate (reflux) cooler 6. For the feeding of the mixture of the material, the still 1 is equipped with a filling tube 7, which maintains the content of the pot 1 at a constant level and constant concentration. The feeding branch 2 is surrounded by an insulting and/or tempering jacket 8, and, for measuring the temperature of the vapor mixture a thermometer 9 is provided. The dephlegmator 3 is cooled by means of a cooling jacket 10; a branch 11 is provided for the feeding of the cooling medium and a branch 12 for the removal of the cooling medium. The temperature can be measured in the bend 4 by means of a thermometer 13. The pot 1 is placed in a temperature bath 14, which is heated by means of a heating device 15 including an electric coil.

The mixture of the material present in the pot 1 is heated by means of the temperature bath 14, so that the corresponding vapor mixture is formed, which is then fed through the feeding branch 2 to the dephlegmator 3. By means of the insulating and tempering jacket 8, respectively, a visible condensation is prevented. The vapor is partially condensed in the dephlegmator 3, as the vapor is guided along the walls cooled by the cooling jacket 10, which is brought about by the structure of the dephlegmator. The cooling is controlled by the stream speed and the temperature of the cooling medium. The condensate formed, which flows in counter-current to the vapor through the dephlegmator 3, is caught at the end of the feeding branch 16 and can be removed and reused after passage through the condensate cooler 6. The remaining vapor emerging at the upper end of the dephlegmator 3 is fed through the bend 4 to the distillate cooler 5 and is removed at the end of the latter as a distillate.

In the embodiment disclosed in FIG. 2 of a dephlegmator is designed in the manner of a De Laval nozzle as a conically narrowing tube provided between the evaporation device and the entering point of the conically widening tube; consequently, the two tubes are connected together at the point 17 of the smallest diameter. This apparatus is suitable particularly for greater vapor speeds.

Example

In an apparatus, as disclosed in FIG. 1, the pot 1 was filled with 4.7 l. of an aqueous ethanol solution. The vapor flowing from the pot 1 had a composition of 30 mol percent ethanol. The vapor composition was maintained constant by addition of an ethanol-water-mixture in the pot 1 by means of an Orlita fine-dosage-pump which returned the distillate and the reflux into the pot 1. The ethanol content of the distillate and of the reflux was determined in individual tests by density measurements. For different reflux conditions were $v$ and different vapor entrance speeds $w$, the following ethanol contents were measured in the distillate:

| Vapor entrance speed $w$ (m./sec.) | Ethanol contents of the distillates (mol percent, ethanol) | | |
| --- | --- | --- | --- |
| | Reflux ratio $v=0.5$ | Reflux ratio $v=1$ | Reflux ratio $v=3$ |
| 4.20 | 44.5 | 48.5 | 53.5 |
| 4.70 | 45.6 | 48.7 | |
| 5.50 | 46.2 | 49.1 | 52.1 |
| 6.50 | 46.3 | | |

With the arrangement according to FIG. 1 by the use of a 6 l. pot up to 2.5 kg. ethanol-vapor mixture could be dephlegmated per hour.

By filling the pot 1 with a 10% aqueous solution of sodium chloride, 1.5 l. of water was distilled under similar test conditions as stated above. In the distillate, no chloride ions could be found in an analytical test with silver nitrate, from wihch it appears that in spite of the great vapor speed, no droplets were entrained into the distillate from the pot 1.

It is to be understood, that the present invention is not limited to the shown examples. The cross-section of the conical tube can be circular, polygonal or the like. The conical widening can also be provide only in one or a plurality of planes.

While I have disclosed several embodiments of the present invention, it is to be understood that these embodiments are given by example only and not in a limiting sense, the scope of the present invention being determined by the objects and the claims.

I claim:
1. In a process of fractional condensation in which a gaseous mixture of individual condensable components, each in the gas phase, is passed in admixture through an unobstructed zone in which at least one of said components is, at least in part, condensed, and the remaining components exit in the gas phase from said zone in greater concentration than when entering the zone in the mixture, the improvement which comprises:

forming said zone traversed by the mixture, in which at least one component is at least partially condensed, to have a continuously, uniformly and symmetrically increasing cross-sectional area in the direction of flow of the mixture therethrough, the zone being coexistensive with a temperature controlling device surrounding the zone whereby near vapor-liquid thermodynamic equilibrium is established in all zones extending perpendicularly to the direction of flow of the non-condsensed gases through the zone at substantially any rate of flow of the mixture through the zone;

achieving admixture of all said condensable components prior to passing said mixture into the end of the zone which is of the smallest cross-sectional area;

after achieving said admixture, and until the instant said mixture is passed into the end of said zone which is of smallest cross-sectional area, passing said mixture through a feeding zone which is, at all points along the line of flow of said mixture to said first-mentioned zone, of a cross-sectional area, as measured perpendicularly to the direction of flow of the mixture, at least as great as the cross-sectional area of the end of said first-mentioned zone when said mixture initially enters; and passing said mixture through said first-mentioned zone at a velocity exceeding four meters per second.

2. The process defined in claim 1 and further characterized to include the step of recovering condensate from the peripheral boundary of said first-mentioned zone and isolating said condensate from all vapors which are not condensed in said first-mentioned zone.

3. The process defined in claim 1 and further characterized to include the step of cooling the peripheral boundary of said first-mentioned zone to at least in part condense at least one of said components.

References Cited

UNITED STATES PATENTS

| | | | |
|---|---|---|---|
| 2,573,807 | 11/1951 | Piros et al. | 202—161 X |
| 2,701,789 | 2/1955 | White | 202—161 |
| 2,842,485 | 7/1958 | Zellner | 202—174 |
| 2,909,469 | 10/1959 | Griffith | 202—185 X |
| 3,219,551 | 11/1965 | Carel et al. | 23—259 X |
| 511,288 | 12/1893 | Chase | 202—182 |
| 2,590,226 | 3/1952 | Baumann | 202—185 X |
| 3,107,205 | 10/1963 | Moran et al. | 203—42 X |

FOREIGN PATENTS

| | | |
|---|---|---|
| 1,031,280 | 6/1958 | Germany. |
| 579,463 | 8/1946 | Great Britain. |

NORMAN YUDKOFF, *Primary Examiner.*

F. E. DRUMMOND, *Assistant Examiner.*